Figure 1:
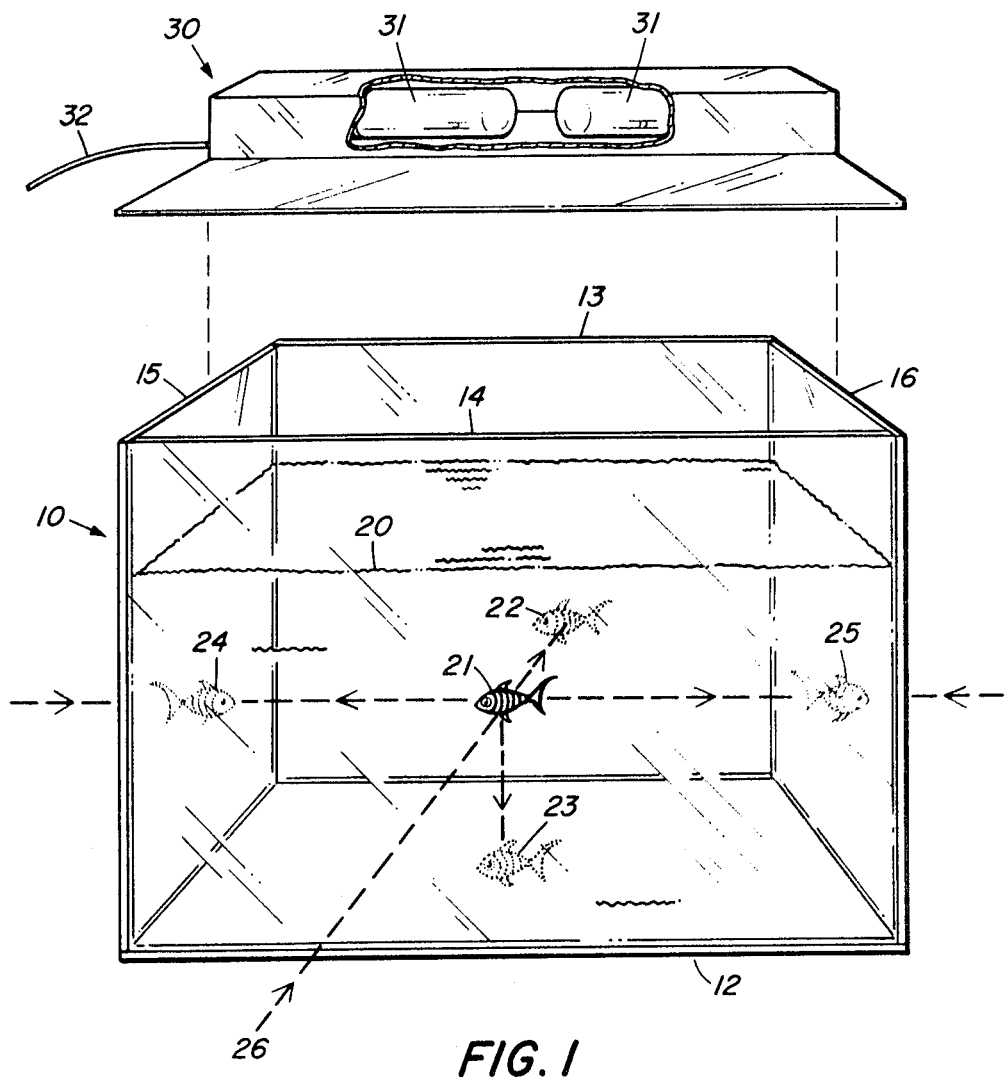

United States Patent

Hendges

[15] 3,706,299
[45] Dec. 19, 1972

[54] MIRRORED MARINE AQUARIUM

[72] Inventor: Louis W. Hendges, Rt. 3, Box 291, Old Emmorton Road, Belair, Md. 21014

[22] Filed: July 22, 1971

[21] Appl. No.: 165,287

[52] U.S. Cl. .................................... 119/5, 220/4 R
[51] Int. Cl. ...................... B65d 13/02, A01k 63/00
[58] Field of Search ........................... 119/5; 220/4 R

[56] References Cited

UNITED STATES PATENTS

| 22,019 | 11/1858 | Davis | 119/5 |
| 2,293,612 | 8/1942 | Montague | 119/5 |
| 2,213,868 | 9/1940 | Lucian | 119/5 X |
| 2,879,742 | 3/1959 | Morrill | 119/5 |
| 3,119,371 | 1/1964 | Zuckerman | 119/5 |

*Primary Examiner*—Aldrich F. Medbery
*Attorney*—Walter G. Finch

[57] ABSTRACT

This invention is directed to an aquarium which is illuminated by one-way and two-way glass mirrors to enhance the marine life therein. The mirrors are used to construct a watertight aquarium. A concealed light is positioned in the top of the aquarium and its light is reflected downwardly therein to illuminate the marine life.

2 Claims, 1 Drawing Figure

PATENTED DEC 19 1972 3,706,299

LOUIS W. HENDGES
INVENTOR

BY *Walter G. Finch*
ATTORNEY

MIRRORED MARINE AQUARIUM

This invention relates generally to aquarium devices, and more particularly to an aquarium constructed of mirrors for use in enhancing the marine life therein.

It is an object of this invention to provide an aquarium which is constructed of illuminated one-way and two-way glass mirrors for enhancing the marine life therein.

Still another object of this invention is to provide a mirrored type aquarium which is unique in forming various sized images of marine life therein.

And another object of this invention is to provide an aquarium of mirrored design in which the marine life therein is reflected and duplicated many times to make for a much more interesting viewing thereof.

And a further object of this invention is to provide a mirrored type aquarium which is economical to manufacture, efficient and reliable in operational use, and easy to maintain.

The FIGURE of the drawing shows an exploded perspective view of the aquarium with a fish and its images as viewed from the outside.

Other objects and attendant advantages of the invention will become more readily apparent and understood from the following detailed specification and accompanying perspective drawing shown an aquarium 10 having a bottom 12 and a back 13, each formed of a one-way glass mirror. In addition, the left and right sides 15 and 16, and the front 14 of the aquarium are formed of two way glass mirrors. A removable top 30 having concealed lights 31 is also provided for the aquarium 10. These lights 31 are connected to a suitable source of power by a light power cord 32.

These glass mirrors 12, 13, 14, 15, and 16 are cut to proper size and are then cemented together to form a water tight open aquarium 10. The aquarium 10 is filled with water 20 and the usual aquarium accessories and marine life are added.

When the lights 31 are turned on, the features of this invention are apparent. All of the marine life, and other items in the tank are reflected and duplicated many times over in all of the mirrors, thus making for much more interesting viewing through the two-way mirrors 14, 15, and 16, as illustrated by an object 21, such as a fish. For example, the fish 21 is shown reflected by reflection 22 in the back mirror 13; by the reflection 23 in the bottom mirror 12; by the reflection 24 in and through the left hand mirror 15; by the reflection 25 in and through the right hand mirror 16; and by the reflection 26 in and through the front mirror 14.

It is to be noted that the reflections will only occur when the amount of light inside the aquarium 10 is greater than the amount of light on the outside thereof. The aquarium 10 can be formed with parallel or converging sidewalls 15 and 16 as shown.

Obviously many modifications and variations of the present invention are possible in light of the above teachings. It is, therefore, to be understood that within the scope of the appended claims the invention may be practiced otherwise than as specifically described.

What is claimed is:

1. An aquarium for marine life, comprising, a housing constructed of mirrored sides and bottom, and means for illuminating the interior of said aquarium to a brighter intensity than the exterior of said aquarium, said aquarium including opposite sides and a front formed by two-way mirrors comprising a means whereby the interior reflected images of marine life can be viewed from the exterior.

2. An aquarium as recited in claim 1, wherein the bottom and back of said aquarium are formed of one-way mirrors.

* * * * *